(12) United States Patent
Feltes et al.

(10) Patent No.: US 12,168,974 B2
(45) Date of Patent: Dec. 17, 2024

(54) WIND ENERGY SYSTEM AND METHOD FOR CONTROLLING A WIND POWER SYSTEM

(71) Applicants: Christian Feltes, Hamburg (DE); Christian Jahn, Quickborn (DE); Nils Thomsen, Elmshorn (DE); Jörn Runge, Marklohe (DE)

(72) Inventors: Christian Feltes, Hamburg (DE); Christian Jahn, Quickborn (DE); Nils Thomsen, Elmshorn (DE); Jörn Runge, Marklohe (DE)

(73) Assignee: innogy SE, Essen (DE)

(*) Notice: Subject to any disclaimer, the term of this patent is extended or adjusted under 35 U.S.C. 154(b) by 1097 days.

(21) Appl. No.: 16/729,010

(22) Filed: Dec. 27, 2019

(65) Prior Publication Data

US 2020/0132049 A1 Apr. 30, 2020

Related U.S. Application Data (63) Continuation of application No. PCT/EP2018/064842, filed on Jun. 6, 2018.

(30) Foreign Application Priority Data

Jun. 28, 2017 (DE) .................... 10 2017 114 309.2

(51) Int. Cl.
 *F03D 9/25* (2016.01)
 *F03D 7/02* (2006.01)
 *F03D 17/00* (2016.01)

(52) U.S. Cl.
 CPC ............. *F03D 9/257* (2017.02); *F03D 7/028* (2013.01); *F03D 17/00* (2016.05); *F05B 2270/1033* (2013.01)

(58) Field of Classification Search
 CPC .......... F03D 7/028; F03D 17/00; F03D 9/255; F03D 9/25; F03D 7/02; F03D 9/00;
 (Continued)

(56) References Cited

U.S. PATENT DOCUMENTS

2008/0225452 A1* 9/2008 Stoupis ............. H02J 13/00034
 361/62

FOREIGN PATENT DOCUMENTS

DK 2680390 T3 11/2016
EP 2636894 A2 9/2013
(Continued)

OTHER PUBLICATIONS

Feltes et al., English translation of EP-2680390-A2, 2014 (Year: 2014).*

(Continued)

*Primary Examiner* — Luan V Van
*Assistant Examiner* — Shizhi Qian
(74) *Attorney, Agent, or Firm* — Reinhart Boerner Van Deuren P.C.

(57) ABSTRACT

Provided are embodiments of a wind energy system. The system includes a plurality of wind turbines connected to at least one cable network. The cable network is configured to transmit the electrical power fed-in by the connected wind turbines. The system also includes at least one control apparatus configured to control the power fed into the cable network by at least one of the wind turbine by providing at least one power set point. At least one temperature detecting device is configured to detect the temperature of the cable network. At least one condition detecting device is configured to detect the condition of the wind energy system, and the control apparatus includes at least one control device configured to determine the power set point based on the detected temperature and the detected condition.

11 Claims, 4 Drawing Sheets

(58) Field of Classification Search
CPC .............. F03D 7/04; F05B 2270/1033; F05B 2270/3032; F05B 2270/335; H02J 3/38; H02J 3/001
See application file for complete search history.

(56) References Cited

FOREIGN PATENT DOCUMENTS

| | | | | |
|---|---|---|---|---|
| EP | 2680390 A2 * | 1/2014 | ........... | F03D 7/0284 |
| WO | WO-2016058617 A1 * | 4/2016 | ............. | F03D 7/028 |

OTHER PUBLICATIONS

Distasio C., https://inhabitat.com/scientists-transmit-data-across-a-national-electricity-grid-for-the-first-time, 2016 (Year: 2016).*
Mir-Artigues et al., The conmonics and policy of solar photovoltaic generation, Springer, 2016 (Year: 2016).*
F. Richert et al., "Kabeldimensionierung bei der Netzanbindung von Offshore-Windparks unter Berücksichtigung der zeitlichen Leistungsabgabe", DEWI Magazine, No. 24, Feb. 24, 2004, 5 pages.

* cited by examiner

WIND ENERGY SYSTEM AND METHOD FOR CONTROLLING A WIND POWER SYSTEM

CROSS-REFERENCE TO RELATED PATENT APPLICATIONS

This patent application is a continuation of PCT/EP2018/064842, filed Jun. 6, 2018, which claims priority to German Application No. 10 2017 114 309.2, filed Jun. 28, 2017, the entire teachings and disclosure of which are incorporated herein by reference thereto.

FIELD

The application relates to a wind energy system, in particular an offshore wind energy system, comprising a plurality of wind turbines connected to at least one cable network, wherein the cable network is configured to transmit the electrical power supplied by the connected wind turbines, at least one control apparatus configured to control the power supplied to the cable network by at least one of the wind turbine by providing at least one power set point. In addition, the application relates to a control apparatus and a method for controlling a wind turbine.

BACKGROUND

The demand for electrical energy from renewable sources is rising steadily. One of the available resources is wind energy. A wind turbine is generally configured to convert the kinetic energy of the wind into electrical energy by means of a rotor and a generator.

Wind energy systems according to the present application comprise a plurality of wind turbines. The wind turbines can be connected to each other via at least one (electrical) cable network. The wind energy system, comprising the wind turbines and the electrical cable network, comprise at least one electrical connection point in order to feed the electrical energy provided and generated, respectively, by the wind energy system into another electrical system, for example a connected public power grid. In other words, a wind energy system in accordance with the present application, in particular the electrical topology of the wind energy system, comprises no longer parts of the further electrical system.

In order to maximize the total energy yield, the wind energy system can be located in areas with high wind probability and intensity. Locations on the open sea, also known as offshore areas, are particularly suitable. However, the requirements for offshore wind energy systems and offshore wind farms, respectively, differ significantly from those for onshore wind energy systems. For example, special offshore wind energy devices must be used as wind energy devices. In particular, it is concern, to reduce the high level of maintenance and servicing required due to the special location at sea and the associated difficulty of access to the site.

In addition, it is a constant concern to maximize the power quantity that can be delivered. Particularly in the event of a network fault within the wind energy system, it is common practice in the prior art technology to reduce the power fed into the cable network from the wind turbines by a fixed (predetermined) value. For example, if a network fault is detected, a control apparatus can provide corresponding power set points to the wind turbines and transmit them to the wind turbines via a communication network. Indeed, this ensures that other electrical equipment (cable network, transformers, etc.) is not damaged. However, the power that can be delivered to another electrical system is significantly reduced.

BRIEF SUMMARY

Therefore, object of the present application is to provide a wind energy system which enables an increase in the deliverable power, in particular in the event of a network fault in the wind energy system, without increasing the risk of damage to electrical equipment.

The object is solved according to a first aspect of the application by a wind energy system, in particular an offshore wind energy system, as described herein. The wind energy system comprises a plurality of wind turbines connected to at least one cable network. The cable network is configured to transmit the electrical power fed-in by the connected wind turbines. The wind energy system comprises at least one control apparatus configured to control the power fed into the cable network from at least one of the wind turbines by providing at least one power set point. At least one temperature detecting device is provided, configured to detect the temperature of the cable network. At least one condition detecting device is provided, configured to detect the condition of the wind energy system. The control apparatus comprising at least one control device configured to determine the (at least one) power set point based on the detected temperature and the detected condition.

Contrary to the state of the art, no general reduction of the power fed into the cable network by the wind turbines takes place. Instead, the power of at least one wind turbine is controlled (regulated) in accordance with the application, depending on the (instantaneous) temperature of the cable network and the (instantaneous) condition of the wind energy system.

The wind energy system is in particular an offshore wind energy system. In particular, a wind energy system according to the application comprises at least one (offshore) transformer station (substation) and a plurality of wind turbines. The wind turbines can preferably be arranged in the form of at least one string. A string comprises two or more wind turbines arranged electrically in series. Preferably a plurality of strings can be provided. One end of a string can be electrically coupled to the transformer station. The other end of a string may have an electrical connection to one end of another string. During normal operation of the wind energy system, i.e. in the event that there is no network fault, this electrical connection may be open and disconnected, respectively. If a network fault occurs in one of the two strings, the electrical connection (also called loop connection) can be closed so that electrical power can be transmitted via this connection. It shall be understood that this electrical connection (or another appropriately formed electrical connection) can also be arranged between other connection points of the strings.

Each wind turbine of the wind energy system is electrically connected to the cable network of the wind energy system. A wind turbine feeds the electrical power generated from the kinetic wind energy, in particular an electrical current, into the cable network. For example, the fed-in power can be supplied (delivered) to the (offshore) transformer station via the cable network. In particular, a cable network in accordance with the application comprises a plurality of power cables, in particular submarine cables, forming electrical connections. These cables can be dimensioned in such a way that in normal operation the maximum current carrying capacity of these cables is not exceeded even with the maximum fed-in power by the wind turbines. The electrical connection described above (loop connection) is also part of the cable network.

According to the application, the wind energy system comprises at least one temperature detecting device. The temperature detecting device is configured to detect the temperature of the cable network. The detecting of the temperature comprises in particular the measuring of the instantaneous (current) temperature of the cable network at at least one cable network position and one measuring point, respectively. At least one suitable measuring point can be selected. Preferably, the temperature can be measured (almost) continuously. By taking the temperature of the cable network into account during control, it can be ensured that a maximum permissible temperature of the cable network is not exceeded.

In addition, the wind energy system according to the application comprises a condition detecting device. The condition detecting device is configured to detect the condition of the wind energy system. The detecting of the condition comprises in particular the detecting of the instantaneous (current) condition of the wind energy system. According to the application, the condition of the wind energy system is to be understood in particular as the electrical condition. For example, the electrical condition is configured to measure electrical parameters such as a current flowing through the cable network. For example, to detect the condition of the wind energy system, the current power set points of the wind turbines, the currently fed-into power (or current), the current condition of electrical components (e.g. transformer, converter), etc. can be detected. By taking the (electrical) condition of the wind energy system, in particular of the electrical equipment of the wind energy system, into account during control, the maximum power provided by the wind energy system can be increased without endangering the electrical equipment.

The control apparatus comprises a control device. The control device can generate at least one power set point for at least one wind turbine based on the detected temperature and the detected condition. In particular, the power set point is generated in such a way that the maximum possible power from the wind turbines is fed into the cable network based on the current condition and current temperature of the cable network. It goes without saying that two or more individual power set points can be determined. Further, determining the (at least one) power set point comprises increasing or reducing (i.e. adjusting) a previous power set point.

The wind energy system may comprise a (wireless and/or wired) communication network. In particular, at least each wind turbine, in particular the respective local control module, and the control apparatus may be connected to the communication network. The at least one power set point for the at least one wind turbine can then be transmitted from the control apparatus to the at least one wind turbine via the communication network by appropriate transmission equipment. In addition, sensor data, for example, can be transmitted via the communication network.

According to a first embodiment of the wind energy system in accordance with the application, the control device may comprise at least one comparing module. The comparing module can be configured to compare the detected temperature with at least one set temperature. The set temperature is in particular a maximum permissible temperature. The control device may be at least configured to determine the power set point based on the comparison result. In particular, if the detected temperature exceeds the set temperature, determining the power set point based on this comparison result may comprise reducing the power set point.

Preferably, at least one predetermined set temperature can be dependent on the 2K criterion. The 2K criterion must be met in particular by a submarine cable. The operation of a submarine cable is subject to certain environmental protection requirements. One of these environmental protection requirements is the so-called 2K criterion. The 2K criterion requires that the temperature rise in the seabed (above) the submarine cable at a depth of 0.2 m to 0.3 m shall not exceed 2 Kelvin. For example, the control of the power fed into the power network by at least one wind turbine in compliance with the 2K criterion can be conducted based on a stationary approach.

For a first stationary approach, the following calculation rule can be implemented $$\Delta\vartheta(x, y) = \frac{P'}{2 \cdot \pi \cdot \lambda} \ln \frac{s'}{s}, \tag{a}$$

wherein $\Delta\varepsilon(x, y)$ is the temperature rise where x and y are the coordinates of the measurement reference point, P' is the power loss per meter, $\lambda$ is the thermal conductivity of the seabed, s is the distance of the submarine cable to the measurement reference point at a depth of 0.2 m from the surface of the seabed, and s' is the distance to that reference point from a submarine cable mirrored at the seabed.

Alternatively or in addition to the stationary approach, the power can be controlled with a dynamic approach. With this approach, the following calculation rule can be implemented:

$$\Delta\vartheta(t) = \frac{P'}{2 \cdot \pi \cdot \lambda} \cdot \left\{ E1\left[\frac{s^2}{4 \cdot \alpha_B \cdot t}\right] - E1\left[\frac{s'^2}{4 \cdot \alpha_B \cdot t}\right] \right\}, \tag{b}$$

wherein E1(x) is the following exponential integral function $$E1(x) = -0.5772 - \ln x - \sum_{n=1}^{\infty} (-1)^n \cdot \frac{x^n}{(n \cdot n!)}. \tag{c}$$

Hereby, is $$x = \frac{s^2}{4 \cdot \alpha_B \cdot t} \text{ and } \alpha_B = \frac{\lambda}{\delta \cdot c}$$

wherein $\alpha_\beta$ is he thermal diffusion coefficient of the seabed, $\delta$ is the density of the seabed and c is the specific heat capacity of the seabed.

The advantage of the stationary approach, i.e. a time-independent approach, is that this control can be carried out particularly simply and with little computing time. According to an embodiment, the set temperature can be a stationary temperature set value. The control of the power and the current, respectively, can be time-independent. In other words, the current fed into the cable network is controlled to a constant current value.

With a dynamic approach, according to an embodiment, the set temperature can be a time-dependent temperature parameter. The control of the power and the current, respectively, can be time-dependent. By means of a time-dependent control, it is possible to take into account and use, respectively, the fluctuations in power generation that occur during the operation of an offshore wind energy system, for example due to changes in the wind force. In particular, the temperature change in the seabed can occur with a time delay of hours to days. Therefore, for example, a higher current and power, respectively, can flow through the cable network, in particular a specific section of the cable network, for a specific period of time than in the case of a stationary view, if subsequently, for example due to a lower wind force, a lower current flows through the cable network, in particular the specific section of the cable network, compared to the stationary view. For example, in a first period, a current can be fed into the specific section of the cable network that is greater than the current in a subsequent second period. The amount of current that can be transmitted can be increased even further if, for example, a phase with lower wind speeds falls into the second period.

In order to determine the time-dependent maximum permissible current in the dynamic approach, a renewed control can be carried out in the event of a change in the fed-in current and the fed-in power, respectively. Preferably, in order to determine the maximum permissible current, the current and future temperature change at the reference point can be calculated continuously or at specific time intervals depending on the superposition of the instantaneous current and the current fed-in in the past.

According to a further embodiment, the maximum allowable current can be determined as a function of the resistance of the submarine cable and/or the distance of the submarine cable to the reference point and/or the distance of the submarine cable mirrored at the sea surface to the reference point and/or the thermal conductivity of the seabed and/or the thermal diffusion coefficient of the seabed. In particular, a time-variant, maximum permissible current can be determined as a function of all parameters. Preferably, a calculation rule can be implemented, for example, in a suitable calculation device. The computing device, such as a forecasting device, may be configured to calculate the maximum allowable current by means of these parameters and the value of the temperature parameter by the calculation rule. A prompt and accurate determination of the maximum permissible current is possible.

According to a preferred embodiment, the temperature detecting device may be configured to detect a first temperature value at a first cable network position (and a first measurement point, respectively) and at least one further temperature value at at least one further cable network position (and a further measurement point, respectively). In particular, the temperature detecting device may be configured to detect a plurality of temperature values at (a corresponding plurality of) measurement points. For example, the temperature detecting device may comprise a reflection measuring device. For example, an optical fiber can be integrated into a cable of the cable network, which is used to measure the temperature values. By detecting multiple temperature values at different cable network locations, a comprehensive temperature monitoring of the cable network can be provided. The control device may be at least configured to determine the power set point based on the maximum temperature value of the at least two temperature values. In particular, the maximum temperature value of the at least two or more temperature values can be first determined and, for example, provided to the comparing module. The comparing module can compare the maximum temperature value with the set temperature. As described above, the control device can then determine at least one power set point based on the comparison result.

A respective monitoring and determination can, in particular, be carried out separately for each string. Preferably, the temperature detecting device may be configured to detect a first temperature value at a first cable network position of a first string (and a first measuring point, respectively) and at least one further temperature value at at least one further cable network position of the first string (and a further measuring point, respectively). By detecting multiple temperature values at different cable network positions of the first string, a comprehensive temperature monitoring of the first string can be provided. The control device may be at least configured to determine the power set point based on the maximum temperature value of the at least two temperature values of the first string. In particular, the maximum temperature value of the at least two or more temperature values can first be determined and, for example, provided to the comparing module. The comparing module can compare the maximum temperature value with the set temperature. As described above, the control device can then determine at least one power set point for at least one wind turbine of the first string and/or a further string electrically connected to the first string based on the comparison result.

In addition, the temperature detecting device may be configured, according to a further embodiment, to determine the cable network position of the maximum temperature value of the at least two temperature values (e.g. the first string). The control device may be at least configured to determine the power set point based on the determined cable network position. For example, based on the determined cable network position, the at least one power set point of the at least one wind turbine (of the first string and/or of a further string electrically connected to the first string) whose input power is at least partially responsible for the temperature value at this point can be adapted. For example, the result of the detecting of the electrical condition can be that a first wind turbine is x % (e.g. 75%) and at least one further wind turbine is y % (e.g. 25%) responsible for the increased temperature value at point z. Depending on the share of the respective wind turbine in the temperature value, the control device can then adjust at least one power set point of the at least two wind turbines. An improved control can be provided.

According to a further embodiment of the wind energy system in accordance with the application, the condition detecting device may comprise at least one fault detecting module. The fault detecting module can be configured to detect at least one network fault within the wind energy system. The control device may at least be configured to determine the power set point based on the detected network fault. A network fault is understood to be in particular an electrical network fault, which at least makes it more difficult to transmit the electrical power. For example, at least one fault detecting module may include a differential measuring device. For example, a section of the cable network and an electrical connection of the cable network, respectively, such as a submarine cable between two wind energy devices (e.g. wind turbine, (offshore) transformer station, onshore station, etc.), can be monitored by a differential measuring device. For example, the respective current value can be detected at both ends of the section of the cable network. The difference can be determined from the two measured current values. A comparison operation can also be performed. For example, a communication channel for a data exchange of the current values can be provided between the respective current measuring devices at the ends. At least one of the current measuring devices can be configured to determine the difference and sum, respectively. It goes without saying that other electrical parameters (e.g. voltage) can be used. During normal operation of the wind energy system, the amounts of the two specific current values are the same. A network fault of a certain section is particularly present if the difference and sum, respectively, of the certain current values is not equal to zero. It goes without saying that limit values can be specified in order to take into account the current losses of the electrical connection occurring in real operation. It also goes without saying that other measuring methods can be used.

According to a further preferred embodiment, the fault detecting module can be configured to detect the position of the detected network fault within the wind energy system. This can be used, for example, to determine which wind turbines and/or which sections of the cable network are affected by the network fault. The control device may be at least configured to determine the power set point based on the position of the network fault. For example, (only) the at least one power set point of the at least one wind turbine affected by the network fault can be adjusted. "Affected" means that the network fault (indirectly) influences the maximum permissible dispensable power of the wind turbine, in particular reduces it, as otherwise further damages at the electrical equipment may occur.

In accordance with a particularly preferred embodiment, the condition detecting device may comprise at least one switching condition evaluating module. The switching condition evaluating module can be configured to determine the electrical (instantaneous) topology of the wind energy system based on the switching states of a plurality of electrical switching devices of the wind energy system, in particular the cable network. The control device may be configured at least to determine the power set point based on the determined electrical topology of the wind energy system. Topology is to be understood, in particular, as the electrical topology, i.e. the electrical connections between the various wind turbines. The wind energy system, in particular the cable network, can comprise a plurality of switching devices to establish and disconnect electrical connections. As explained above, for example, if a network fault is detected in a specific section of the cable network, this electrical connection section can be disconnected and a further (previously disconnected) electrical connection section can be established instead of this electrical connection section. A switching device may comprise a sensor to detect the (instantaneous) switching state. This can, for example, be transmitted to a (central) switching condition evaluating module of the wind energy system. The switching condition evaluating module can determine the current (actual) electrical topology of the wind energy system based on the received switching states. This improves the control even further, as a more precise individual control of the majority of wind turbines with individualized power set points is possible.

In addition, the condition detecting device may be configured to provide a thermal model of the electrical topology of the wind energy system. This can be stored in a memory device, for example. Based on an electrical model, the effects of a network fault and/or the change of at least one power set point of at least one wind turbine can be simulated. The control device may be configured at least to determine the power set point based on the thermal model provided, in particular a simulation performed with the thermal model.

A further aspect of the application is a control apparatus for a wind energy system, in particular a previously described wind energy system. The control apparatus comprises at least one temperature detecting device configured to detect the temperature of a cable network. The cable network (described in particular above) is configured to transmit the electrical power fed into the cable network by a plurality of wind turbines. The control apparatus comprises at least one condition detecting device configured to detect the condition of the wind energy system. The control apparatus comprises at least one control device configured to determine at least one power set point for controlling the power fed into the cable network from at least one of the wind turbines based on the detected temperature and condition.

In particular, the control apparatus may be a central control apparatus of the wind energy system. The control apparatus can be configured to control all wind turbines of the wind energy system. For example, the control apparatus can be arranged on an (offshore) transformer station. In particular, the control apparatus may comprise a previously described control device, a previously described temperature detecting device and/or a previously described condition detecting device.

A still further aspect of the application is a method for controlling at least one wind turbine of at least one wind energy system, in particular a previously described wind energy system. The method comprises:
 detecting the temperature of a cable network,
 wherein the cable network is configured to transmit the electrical power fed into the cable network from a plurality of wind turbines,
 detecting the condition of the wind energy system, and
 determining at least one power set point for controlling the power fed into the cable network by at least one of the wind turbines based on the detected temperature and detected condition.

It should be noted that in this case the term 'current' means 'apparent current' and the term 'power' means 'apparent power', unless otherwise stated. It should also be noted that the control device can determine the at least one power set point based on a plurality of the criteria described above. In addition, according to the application, devices, modules, etc. may be formed by hardware components (e.g. processors, interfaces, storage media, etc.) and/or software components.

The features of the systems, methods and apparatuses can be freely combined with each other. In particular, features of the description and/or of the dependent claims, even with complete or partial circumvention of features of the independent claims, may be independently inventive in their own right or freely combined with each other.

There is now a multitude of possibilities to design and further develop the wind energy system according to the application, the control apparatus according to the application and the method according to the application. In this regard, reference is made on the one hand to the patent claims subordinate to the independent patent claims, and on the other hand to the description of embodiments in connection with the drawing.

DETAILED DESCRIPTION

In the following, the same reference signs are used for the same elements.

Figure 1:
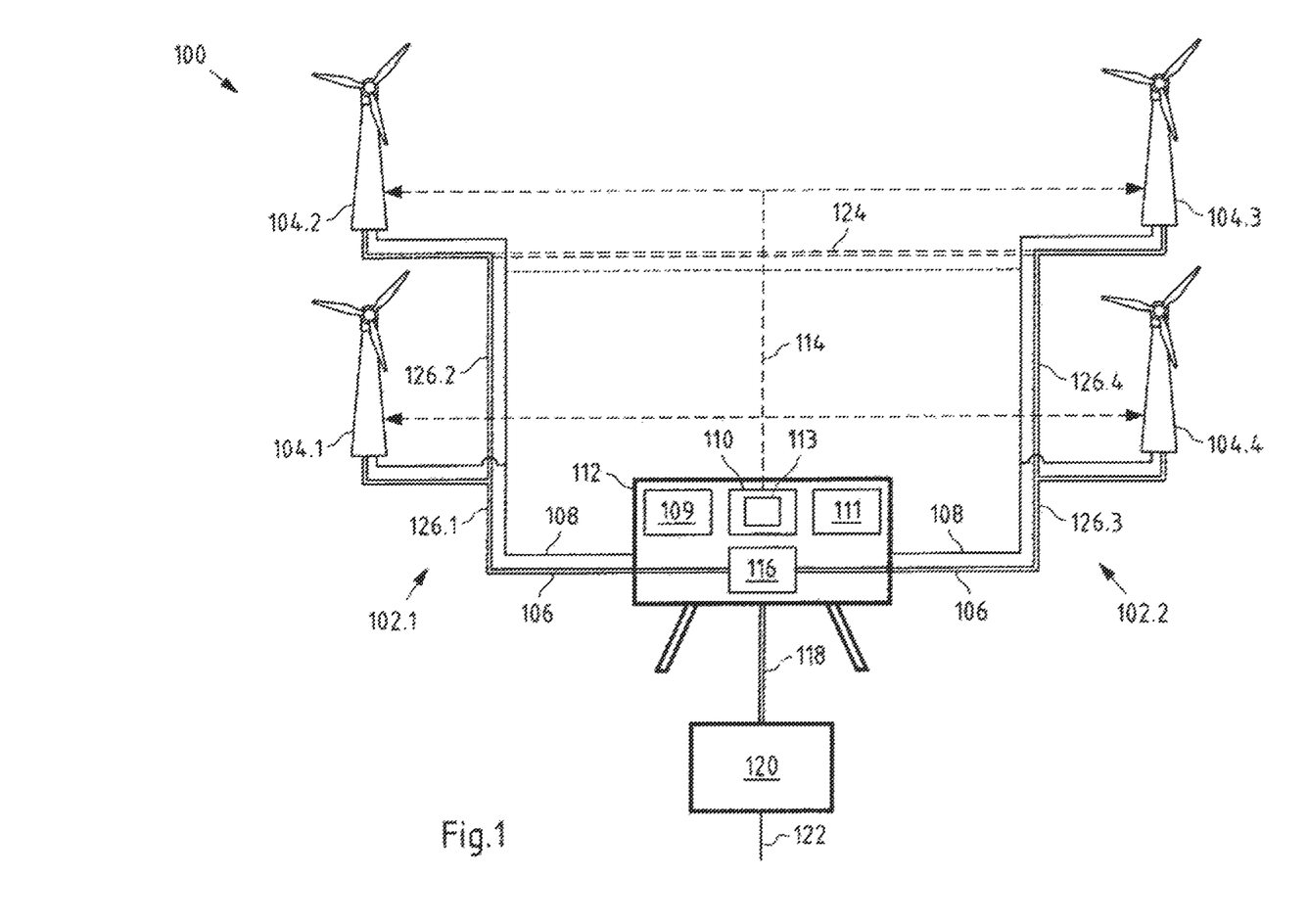
FIG. 1 shows a schematic view of an embodiment of a wind energy system in accordance with the present application.

FIG. 1 shows a schematic view of an embodiment of a wind energy system 100 according to the present application. The shown wind energy system 100 is in particular an offshore wind energy system 100. The offshore wind energy system 100 comprises a plurality of wind energy devices 104, 112 and 120. In particular, an offshore transformer station 112 is arranged. A plurality of wind turbines are electrically connected to the offshore transformer station 112 via a cable network 106, in particular a transformer device 116 of the offshore transformer station 112. The cable network 106 comprises a plurality of submarine cables arranged between different wind turbines 104.1 to 104.4. In addition, the cable network comprises at least one submarine cable between the offshore transformer station 112 and an onshore terminal station 120. The onshore terminal station 120 serves, among other things, as an electrical connection point for feeding the electrical energy provided and generated, respectively, by the wind energy system 100 into another electrical system 122, e.g. a connected public power grid 122. Accordingly, the power grid 122 is not a component of the wind energy system 100 in accordance with the application.

As can also be seen from FIG. 1, the wind turbines 104.1 to 104.4 are arranged in the form of two strings 102.1, 102.2. For a better overview, only two strings 102.1, 102.2 wherein each string 102.1, 102.2 comprises only two wind turbines 104.1 to 104.4 are shown here. According to other variants, one string may have three or more wind turbines and/or three or more strings may be provided.

The wind turbines 104.1, 104.2 of the first string 102.1 are connected in series with each other via electrical connections 126.1, 126.2 in the form of submarine cables 126.1, 126.2. These electrical connections 126.1, 126.2 and connection sections 126.1, 126.2, respectively, can be used to transmit the electrical energy and power, respectively, generated by wind turbines 104.1, 104.2. In particular, between respective two adjacent wind turbines 104.1, 104.2 at least one submarine cable 126.2 is arranged. The wind turbines 104.3, 104.4 of the further string 102.2 can be electrically connected to each other in a corresponding way.

The first wind turbine 104.1 of the first string 102.1 is also electrically connected to the offshore transformer station 112 and substation 112, respectively. The first wind turbine 104.4 of the further string 102.2 is electrically connected to the offshore transformer station 112 in a corresponding manner. In addition, the wind turbine 104.2 at the (other) end of the first string 102.1 can be electrically connected to the wind turbine 104.3 at the end of the second string 102.2. For this purpose an electrical connection 124 (loop connection) of the cable network 106 can be established by closing at least one (not shown) switching device. In addition, further (not shown) switching devices may be provided at other points of the cable network 106, for example to disconnect an electrical connection 126.2, 126.4 between two wind turbines 104.1 to 104.4 due to a network fault within the wind energy system 100.

All wind turbines 104.1 to 104.4 can have essentially the same design. A wind turbine 104.1 to 104.4 may have a generator (not shown) which converts the kinetic energy of the wind into electrical energy.

Furthermore, in the present case at least one optical fiber conductor 108 is integrated in the cables of the cable network 106. Only for the sake of a better overview, the optical fiber conductor 108 runs parallel to the cables of the cable network 106. The optical fiber conductor 108 is in particular configured to enable a temperature measurement of the cable network. In particular, a temperature detecting device 109 may be coupled to optical fiber conductor 108. For example, each string can be monitored separately. By reflection measurements a plurality of temperature values can be measured and detected at a variety of cable network locations. The at least one detected temperature value can be transferred to a control device 113 of a control apparatus 110.

In addition, a condition detecting device 111 is arranged. The condition detecting device 111 is configured to determine the instantaneous (electrical) condition, for example based on the switching states of the (not shown) switching devices. The detected condition can be transferred to the control device 113 of the control apparatus 110.

The control device 113 is configured to determine at least one power set point for at least one wind turbine 104.1 to 104.4 based on the detected temperature and the detected condition. A more detailed description of the control is given below.

Via a communication network 114, the at least one power set point can be transmitted to at least one wind turbine 104.1 to 104.4. A (not shown) local control module of a wind turbine 104.1 to 104.4 can, for example, control the power output of the wind turbine 104.1 to 104.4 in such a way that the power fed into the cable network 106 at least does not exceed the power set point. It shall be understood that the power set point may comprise a current set point.

In this embodiment, the control apparatus 110, the temperature detecting device 109 and the condition detecting device 111 are arranged in the offshore transformer station 112. It goes without saying that at least one of these elements can also be arranged at another location (e.g. the terminal station 120).

Figure 2:
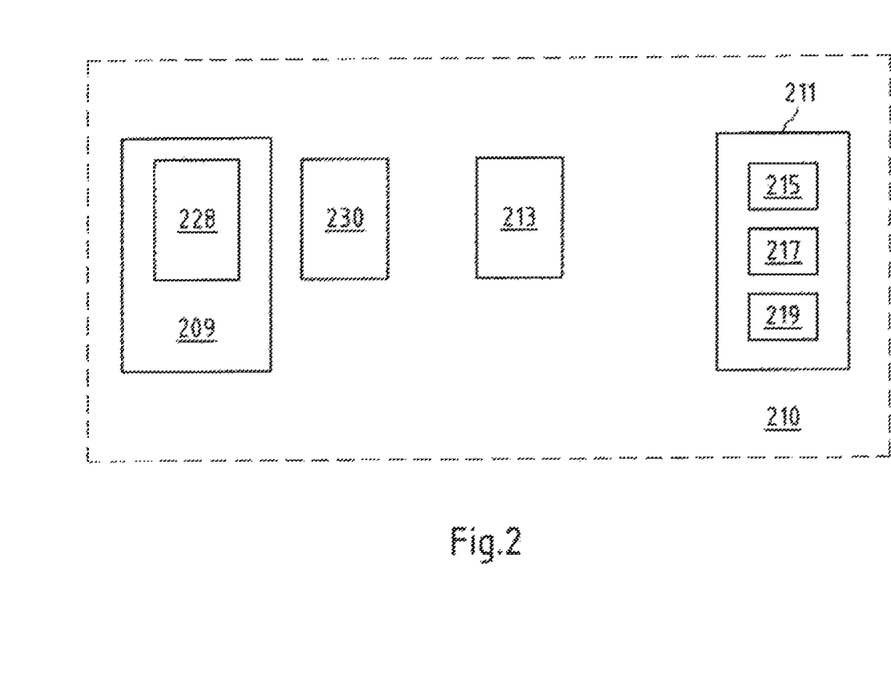
FIG. 2 shows a schematic view of an embodiment of a control apparatus in accordance with the present application.

FIG. 2 shows a schematic view of an embodiment of a (central) control apparatus 210 for a wind energy system in accordance with the present application. In this embodiment, the control device 213, the temperature detecting device 209 and the condition detecting device 211 are integrated in the control apparatus 210.

The temperature detecting device 209 detects in particular a plurality of temperature values from different measuring points. The temperature detecting device 209 comprises a maximum determining module 228 for determining the maximum temperature value from the plurality of detected temperature values (e.g. from a first string). The determined maximum temperature value can be provided to a comparing module 330.

In addition, the temperature detecting device 209 is configured to determine at least the cable network position of the determined maximum temperature value. In particular, the determination can be carried out by means of the reflection measurement. The specified cable network position can be provided to the control device 213.

The comparing module 330 is in particular configured to compare the temperature value provided with a predetermined set temperature. As described above, the set temperature may depend on the 2K criterion. The comparison result, in particular a difference value between the temperature value provided and the set temperature, can be provided to the control device 213.

The condition detecting device further comprises a fault detecting module 215, a memory module 217 and a switching condition evaluating module 219. The fault detecting module 215 is configured to determine an electrical network fault within the wind energy system (e.g. system 100). A network fault in a further system (e.g. 122) cannot be determined. In addition, the fault detecting module 215 can at least also determine the fault position, for example the affected electrical connection section (e.g. 126.1 to 126.4, 118).

Alternatively or additionally, the fault detecting module 215 can determine the type of network fault. As described above, the fault detecting module 215 may comprise or be connected to (not shown) sensors which allow a differential measurement of at least one electrical parameter (e.g. current) at at least one electrical connection section (e.g. 126.1 to 126.4, 118).

The detected network fault and, for example, the position of the network fault can be provided to the control device 213. Preferably, the fault detecting module 215 can also provide the detected network fault and, for example, the position of the network fault to a (not shown) switching control module. Based on the data provided, the switching control module can control at least one (not shown) switching device in order to change the switching state. For example, an electrical connection in which the network fault is located can be disconnected and a loop connection can be closed.

The memory module 217 can provide at least one thermal model that can be used, for example, to simulate the effect of a detected network fault and/or a change in at least one power set point.

The switching condition evaluating module 219 is in particular configured to detect the instantaneous switching conditions of the (not shown) switching devices of the wind energy system. For example, each switching device can have an appropriately configured sensor that can transmit an instantaneous switching state to the switching condition evaluating module 219. Based on the sensor data provided (e.g. "closed", "open", "defective", etc.), the switching condition evaluating module 219 can determine the current electrical topology, i.e. the electrical connection state (condition) of the wind energy system. The current electrical topology can also be provided to the control device 213.

The control device 213 may preferably adjust at least one power set point for at least one wind turbine, if necessary, based on the comparison result and at least one condition parameter, preferably all the above mentioned condition parameters. Alternatively or additionally, further condition parameters, such as the condition of the wind turbine (maintenance condition, fault condition, etc.), can be taken into account by control device 213 for the determination of at least one power set point.

Figure 3:
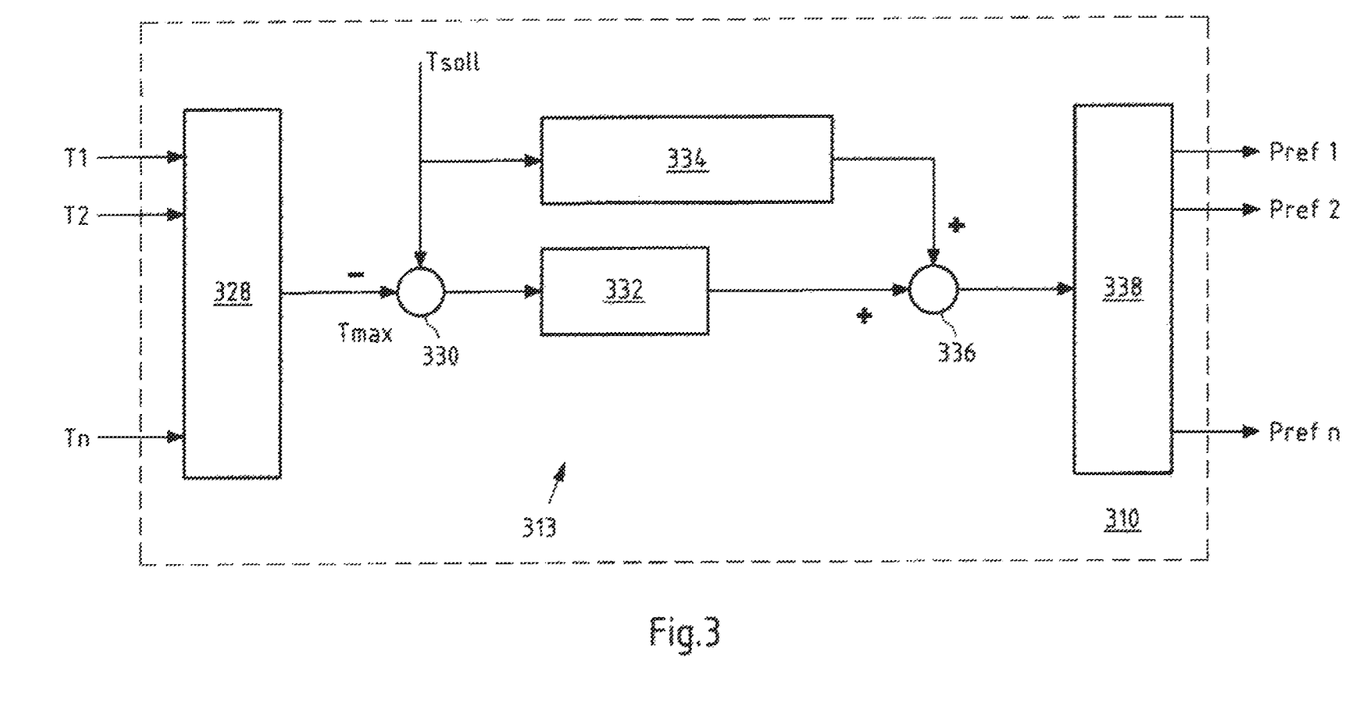
FIG. 3 shows a schematic view of a further embodiment of a control apparatus in accordance with the present application.

FIG. 3 shows a further schematic view of an example of a control apparatus 310 in accordance with the present application. In order to avoid repetitions, only the differences to the example in FIG. 2 are described below. For the other components of the control apparatus 310, it is referred in particular to the above explanations.

A plurality of detected temperature values T1 to Tn, which were measured at a corresponding number of measuring points and cable network positions, respectively, (e.g. from a string), are fed to a maximum determining module 328. The maximum determining module 328 is configured to determine the maximum temperature value $T_{max}$ from the temperature values T1 to Tn provided. This maximum temperature value $T_{max}$ is supplied to a comparing module 330. The comparing module 330 generates a difference between a predetermined set temperature $T_{soll}$ and the maximum temperature $T_{max}$. The set temperature $T_{soll}$ is, for example, $T_{soll}$=90° C.−ΔT, where ΔT is a safety margin.

The difference is fed to a control element 332 of a control device 313. The control element 332, for example, is a PI controller 332 that generates a respective output signal. A model-based pre-control module 334 can also be provided. The output signals of the modules 332, 334 are added by module 336, and provided to a respective generating module 338 for generating power set points $P_{ref1}$ to $P_{refn}$ for the wind turbines $WK_1$ to $WK_n$. These are then transmitted to the wind turbines $WK_1$ to $WK_n$, at least if a power set point $P_{ref1}$ to $P_{refn}$ is changed. The respective wind turbines $WK_1$ to $WK_n$ then adjust the input power in the manner described above based on the power set points $P_{ref1}$ to $P_{refn}$.

It goes without saying that other control devices and/or control elements can be used.

Figure 4:
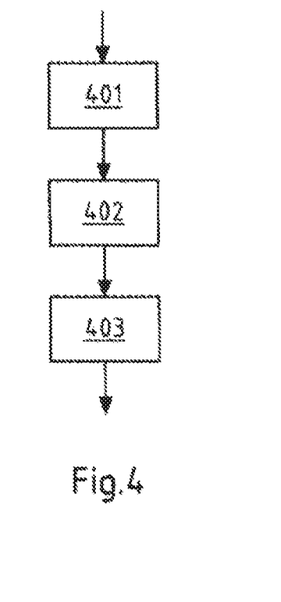
FIG. 4 shows a diagram of an embodiment of a method in accordance with the present application.

FIG. 4 shows a diagram of an embodiment of a method according to the present application, in particular a method for controlling at least one wind turbine of at least one wind energy system, in particular a previously described wind energy system. For example, a control apparatus described above can be used for this purpose. In particular, a control of a wind turbine means the control of the electrical power output and the electrical current output, respectively, to the cable network.

In a first step 401, the temperature of a cable network can be detected, for example, in the manner described above. The cable network is configured in particular to transmit the electrical power fed into the cable network by a plurality of wind turbines. Furthermore, in a further step 402, which preferably takes place in parallel to step 401, the condition of the wind energy system can be detected, for example in the manner described above. Steps 401 and 402 can preferably be carried out almost continuously during operation of the wind energy system.

In the next step 403, at least one power set point can be determined to control the power fed into the cable network by at least one of the wind turbines based on the detected temperature and the detected condition, for example in the manner described above.

According to the application, the wind turbines and wind power plants, respectively, can be connected to the transformer platform via strings, i.e. several turbines are connected via one cable. In the event of a cable fault, strings can be coupled together to form a loop so as not to lose various turbines in the concerned string as producers. The power of the wind turbines, for example, can be controlled using a power management tool. The current load in the intact cable increases according to the additionally connected power. In order to ensure compliance with the cable specification, a cable monitoring system is preferably used for temperature monitoring.

When adjusting the power, the condition of the wind energy system, in particular framework parameters, such as the current topology, cable temperatures, output and power reserves of the wind turbines, etc., must be taken into account and warming effects through power adjustments must be calculated. By means of an intelligent coupling in a controller according to the application, the power adjustment of the turbines can take place automatically. Possible operating errors and omissions can be avoided and a relief of the operating personnel can be provided. This measure also allows the maximum possible amount of energy to be exported in the event of a fault without endangering electrical equipment.

The cable monitoring system and the power management tool of the turbines are coupled via a control apparatus according to the application in such a way that temperature increases in individual cable segments of the cable network directly lead to a power reduction of the turbines involved. For implementation, IEC standards supported by the manufacturers can be used (e.g. IEC 61400-25 on the turbine side, IEC 61850 or IEC 61870-5-104 on the cable monitoring side). In order to detect the current electrical topology of the wind energy system or wind farm, status information, in particular status information such as switch positions, can preferably be transmitted via IEC-61870-5-104 from the substation control system of the transformer platform (HV SCADA).

Preferably, the following information can be transmitted to the (central) control apparatus according to the application, in particular for coupling the various individual systems:

Cable monitoring (temperature values, position (cable network position) of the hotspots (one or more max. temperature values) in the cable strings of the cable network), HV SCADA parameters (switch positions for evaluation of current electrical park topology)

Wind turbines or wind power plants (condition or status with regard to operational readiness)

Preferably, the following information can be transmitted from the (central) control apparatus according to the application to the wind turbines: Set point for active power For example, eight parallel control apparatus and control circuits, respectively, (one control apparatus for each string) are provided, which limit the cable temperature by transferring (limited) set points to the respectively assigned, feeding-in wind turbines. In particular, it can be taken into account that the hotspot can be located at different points, so that only a part of the wind turbines may have to be limited in one string.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A wind energy system, comprising:
a plurality of wind turbines connected to at least one cable network,
wherein the at least one cable network is configured to transmit electrical power fed-in by the connected plurality of wind turbines,
at least one control apparatus configured to control the electrical power fed into the at least one cable network by at least one of the plurality of wind turbines by providing at least one power set point,
at least one temperature detecting device configured to detect a temperature of the at least one cable network,
at least one condition detecting device configured to detect a condition of the wind energy system,
wherein the at least one control apparatus comprises at least one control device configured to determine the at least one power set point based on the detected temperature and the detected condition,
wherein the at least one condition detecting device comprises at least one switching condition evaluating module configured to determine electrical topology of the wind energy system based on switching states of a plurality of electrical switching devices of the wind energy system, and
wherein the at least one control device is further configured at least to determine the at least one power set point based on the determined electrical topology of the wind energy system.

2. The wind energy system according to claim 1, wherein the at least one control apparatus comprises at least one comparing module configured to compare the detected temperature and at least one predetermined set temperature, and
the at least one control device is configured at least to determine the at least one power set point based on the comparison result.

3. The wind energy system according to claim 1, wherein the at least one temperature detecting device is configured to detect a first temperature value at a first cable network position and at least one further temperature value at at least one further cable network position, and
the at least one control device is configured at least to determine the at least one power set point based on the maximum temperature value of the at least two temperature values.

4. The wind energy system according to claim 3, wherein the at least one temperature detecting device is configured to determine the cable network position of the maximum temperature value of the at least two temperature values, and the at least one control device is configured at least to determine the at least one power set point based on the determined cable network position.

5. The wind energy system according to claim 1, wherein
the at least one condition detecting device comprises at least one fault detecting module configured to detect at least one network fault within the wind energy system, and
the at least one control device is configured at least to determine the at least one power set point based on the detected at least one network fault.

6. The wind energy system according to claim 5, wherein
the at least one fault detecting module is configured to detect a position of the detected at least one network fault within the wind energy system, and
the at least one control device is configured at least to determine the at least one power set point based on the position of the at least one network fault.

7. Wind energy system according to claim 1, wherein
the at least one condition detecting device is configured to provide a thermal model of the electrical topology of the wind energy system, and
the at least one control device is configured at least to determine the at least one power set point based on the provided thermal model.

8. The wind energy system according to claim 1, wherein the wind energy system is an offshore wind energy system.

9. A method for controlling the at least one of the plurality of wind turbines of at least one wind energy system, wherein the at least one wind energy system is the wind energy system according to claim 1.

10. A control apparatus for a wind energy system comprising:
at least one temperature detecting device configured to detect a temperature of a cable network,
wherein the cable network is configured to transmit an electrical power fed into the cable network by a plurality of wind turbines,
at least one condition detecting device, configured to detect a condition of the wind energy system, and
at least one control device configured to determine at least one power set point for controlling the electrical power fed into the cable network by at least one of the plurality of wind turbines based on the detected temperature and the detected condition,
wherein the at least one condition detecting device comprises at least one switching condition evaluating module configured to determine an electrical topology of the wind energy system based on switching states of a plurality of electrical switching devices of the wind energy system, and
wherein the at least one control device is configured at least to determine the at least one power set point based on the determined electrical topology of the wind energy system.

11. A method for controlling at least one wind turbine of at least one wind energy system comprising:
detecting the temperature of a cable network,
wherein the cable network is configured to transmit an electrical power fed into the cable network by a plurality of wind turbines,
detecting a condition of the at least one wind energy system,
determining at least one power set point for controlling the electrical power fed into the cable network by at least one of the plurality of wind turbines based on the detected temperature and condition,
determining by at least one switching condition evaluating module of a condition detecting device an electrical topology of the at least one wind energy system based on switching states of a plurality of electrical switching devices of the at least one wind energy system, and
determining by a control device the at least one power set point based on the determined electrical topology of the at least one wind energy system.

* * * * *